(No Model.) 2 Sheets—Sheet 1.
S. C. REYNOLDS.
CONVEYER.
No. 580,533. Patented Apr. 13, 1897.
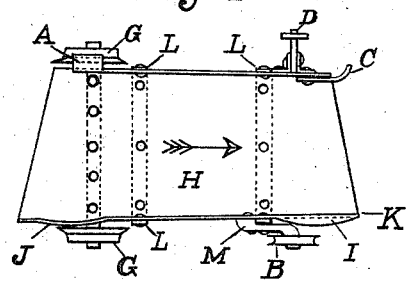
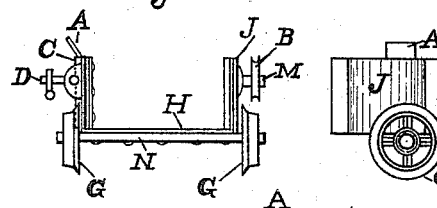
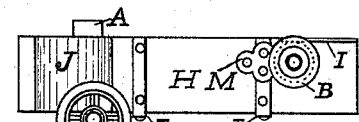
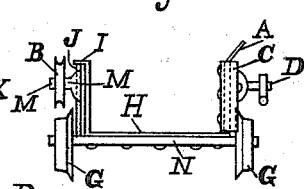
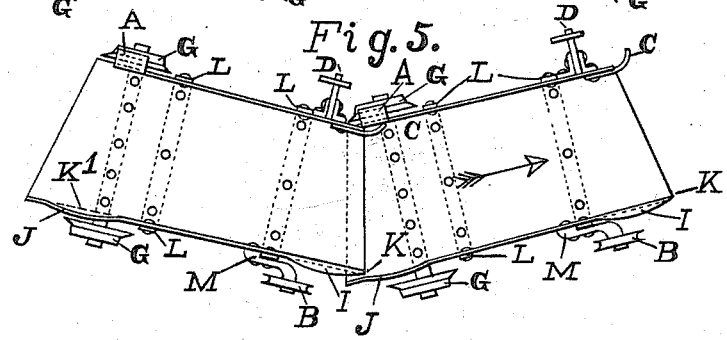
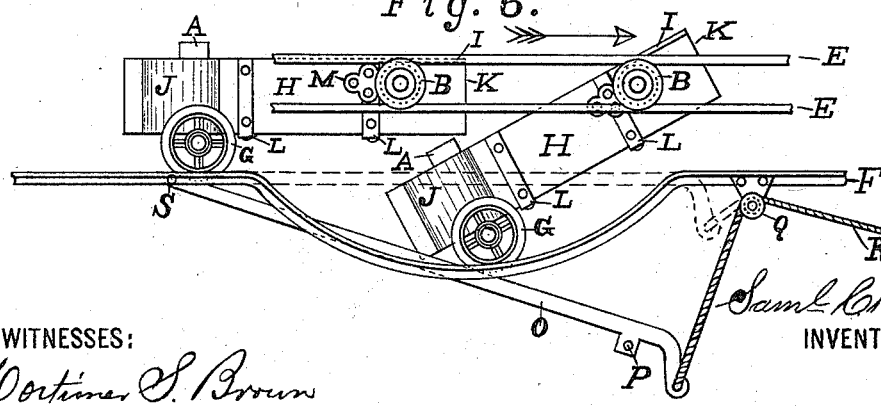
WITNESSES:
Sam'l C. Reynolds
INVENTOR
BY
Chas. DeKay Townsend
ATTORNEY

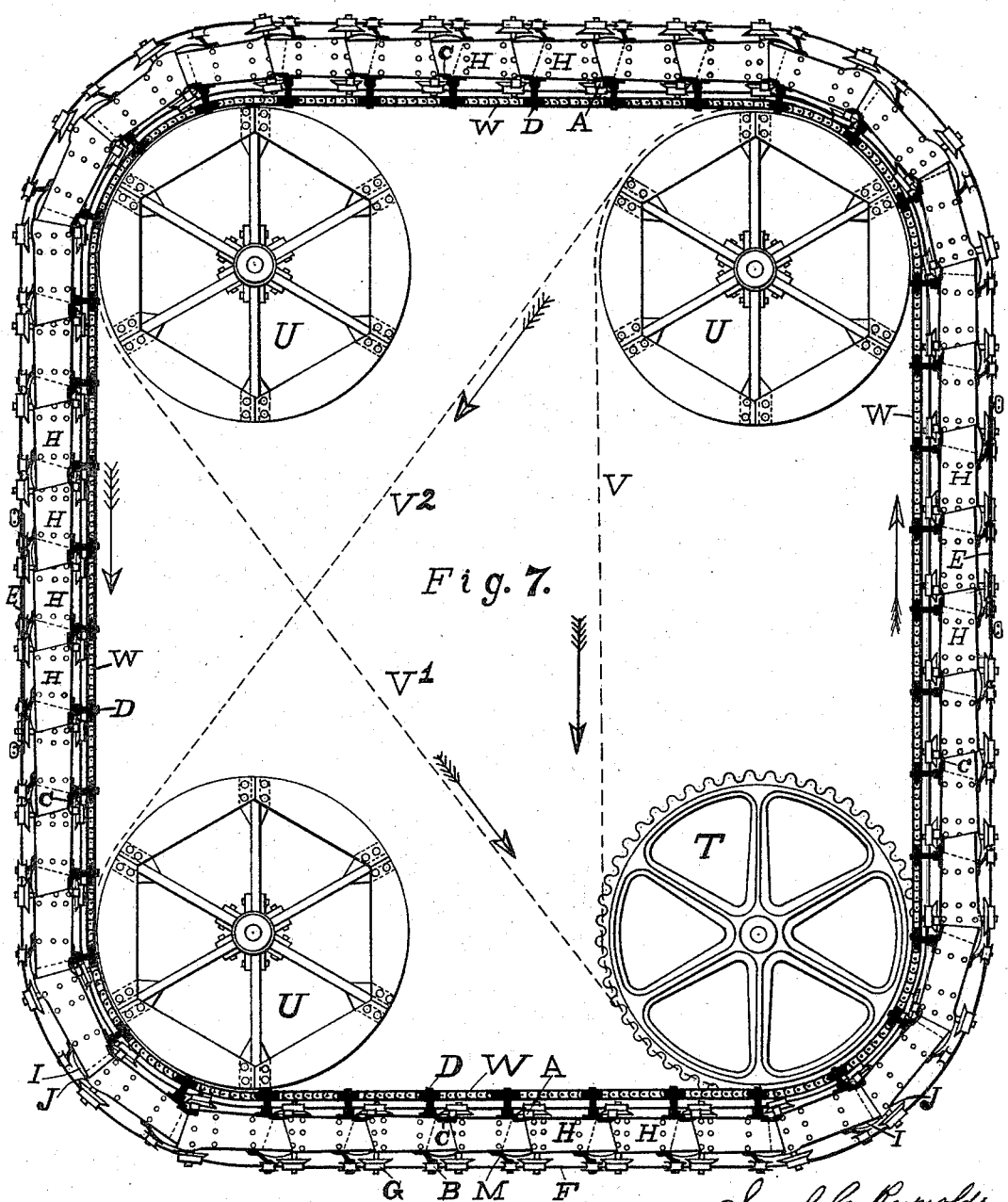

UNITED STATES PATENT OFFICE.

SAMUEL C. REYNOLDS, OF NEW YORK, N. Y.

CONVEYER.

SPECIFICATION forming part of Letters Patent No. 580,533, dated April 13, 1897.

Application filed July 29, 1893. Renewed September 17, 1896. Serial No. 606,175. (No model.)

*To all whom it may concern:*

Be it known that I, SAMUEL C. REYNOLDS, a citizen of the United States, residing at New York, in the county of New York, State of New York, have invented a new and useful Continuous Horizontal Conveyer, of which the following is a specification.

My invention relates to improvements in conveyers or transferrers; and the object of my improvements are, first, to provide a way by which the conveyers or transferrers may be returned empty on the same horizontal plane as traversed when loaded; second, to afford facilities for dumping the materials at different points along the line of the conveyers. I attain these objects by the mechanism illustrated in the accompanying drawings, in which—

Figure 1 is a plan or top view of a single conveyer pan or section as it would appear by itself. Fig. 2 is a side view, Fig. 3 a rear view, Fig. 4 a front view, and Fig. 5 a top view, of two conveyer pans or sections as they would appear when connected to the drive-chain and going around a curve or terminal wheel. Fig. 6 is a side view of two pans or sections. The forward pan is represented as in the act of dumping its load on account of the wheels following the depression in the tracks F. Fig. 7 is a plan view of a complete conveyer with drive-chain W, drive-wheel T, and idle-wheels U U U in working position. The broken lines V V' V², Fig. 7, show how the conveyer can be made to traverse different directions by building the conveyer on any one of the lines V, V', or V².

Similar letters refer to similar parts throughout the several views.

The pan H, Fig. 1, its strengthening-bands L L, and the wheels G G, with their axle N, constitute the framework of the conveyer pans or sections. The spring C, which is riveted to one side of the pan and extends from the top to the bottom of the pan, (see C, Fig. 4,) is to prevent material, while being carried, from getting between the sides of the pans at that point while going around a curve or terminal wheel. The guide A, Figs. 3 and 4, is to force the spring C into position when the rear end of the forward pan rises to a level after dumping.

Referring to Fig. 1, it will be seen that the spring C is riveted to the side of the pan and its free edge presses outward and beyond the edge of the pan. Therefore the next forward pan or section, after dumping (see Fig. 6) and in the act of rising to a level, would strike its side against the lower edge of the spring C. To prevent this, the guide A is brought into use. The outside lower corner of the spring C, striking the slanting surface of the guide A, is pressed inward, as the pans come together, enough to clear the side of the forward pan.

The attachment D is a bolt riveted to the side of the pan next to the drive-chain and extending through an eye or sleeve cast onto one side of the chain-link or clamped onto a cable when a cable is used. The bolt fits loose in the eye or sleeve, so as to form a slip-joint and allow the rear end of the pan to drop down when unloading. The arm M, which is riveted to the side of the pan, is provided with a stud for the sheave-wheel B. This sheave-wheel connects with the side tracks E E at the dumps and acts in a manner to sustain the weight of that side of the forward end of the pan while the rear end is lowered to unload and keeping it in that position until the pan has passed the dump and the forward end again rests in the rear end of the next forward pan.

Where more than one dumping-place is required on the line of the conveyer, it is necessary to provide a level track at all other dumping-places except the one in actual use to allow the pans to pass over these dumps without dumping. To accomplish this, the short straight tracks O are brought into use in the following manner: The tracks O are bolted to the stationary tracks F (see Fig. 6) at the point S and fastened together at P by a rod passing between them and riveted, and are raised into position by the wire rope R, running over the pulley Q, and fastened in such a manner as to hold the tracks O in the position indicated by the broken lines, Fig. 6, and allow the pans or sections to pass over the dump on a straight track, the tread of the wheels G being wide enough to allow their flanges to run between the tracks O.

Referring to Fig. 5, it will be seen that the forward end K of the side of the pan farthest from the drive-chain describes a short curve when the pans leave a straight track to traverse a curve, or vice versa. This is provided for by the swell or bulge J in the rear of the side of the pans or sections, which bulge is made of such a shape that the edge K always has a chafing contact with the side of the next forward pan.

Again referring to Fig. 5, it will be seen that when the pans are brought onto a straight line or running on a straight track there would be a small open space between the straight side of the rear pan and the swell J of the forward pan. (See broken line K', rear pan, Fig. 5.) Should hard substances fall into this space, they would cause the pans to bind at that point when leaving a straight track to traverse a curve. To obviate this and guard against accidents of this kind, the flange I is brought into use to cover the top of this space and is made in such a shape and acts in such a manner, the edge K having a chafing contact with the swell J, that at no time is the top of this space uncovered only when the pan is in the act of dumping. I prefer to carry out these features of my invention in the manner shown in Fig. 7, where it will be seen that a number of these conveyer-pans H or sections form a continuous endless flat bottom trough-like conveyer driven by a single chain W, and the empty sections traveling on the same horizontal plane as that traversed when loaded and provided with the means of dumping their loads at any desired number of places along the line of the conveyer. (See E E, Fig. 7.)

I am aware that prior to my invention conveyers or transferrers have been made, but not like this conveyer. I therefore do not make such claim for conveyers, broadly; but, Having described my invention, what I claim as new, and desire to secure by Letters Patent, is—

1. A conveyer pan or bucket comprising bottom and side pieces, traction-wheels and a guide-wheel, one of the side pieces being provided with a flange at one end and a swell at the other.

2. A conveyer-pan comprising traction-wheels, a guide-wheel, and one side piece provided with a spring at one end and a guide at the other, and the other side piece having a flange at one end and a swell at the other.

3. A conveyer-pan comprising traction-wheels, a guide-wheel, and one side piece provided with a spring at one end and a guide at the other, and the other side piece having a flange at one end and a swell at the other, in combination with a trackway having a curve or depression.

4. A conveyer-pan comprising traction-wheels, a guide-wheel, and one side piece provided with a spring at one end and a guide at the other, and the other side piece having a flange at one end and a swell at the other, in combination with a trackway having a curve or depression, and the swinging track-sections.

5. A series of conveyer-pans each comprising traction-wheels, a guide-wheel, and one side piece provided with a spring at one end and a guide at the other, and the other side piece having a flange at one end and a swell at the other, said conveyer-pans being of such shape in plan as to accommodate their consecutive connection with the pan preceding and the pan following, without intervals between the ends of the said pans in the series comprising the set, so as to admit of their travel around curves on an inclined plane or horizontal track.

6. A series of conveyer-pans each comprising traction-wheels, a guide-wheel, and side pieces, one of each set of side pieces provided with a spring at one end and a guide-plate at the other end, and each of the other set of side pieces having a flange at one end and a swell at the other, each of said conveyer-pans being of such shape in plan as to accommodate its consecutive connection with the pan preceding and the pan following it, without intervals between the ends of the said pans in the series comprising the set, so as to admit of their travel around curves on an inclined plane or horizontal track, in combination with chains or cables having a slip-joint connecting with said pans to accommodate strain or stretch in passing around curves, and means for operating the same.

SAML. C. REYNOLDS.

Witnesses:
MORTIMER S. BROWN,
JAMES I. FAYALL.